United States Patent [19]

Hata et al.

[11] 4,295,154
[45] Oct. 13, 1981

[54] DIGITAL VIDEO AND AUDIO FILE SYSTEM

[75] Inventors: Hidetoh Hata, Yokohama; Katsumi Haji, Narashino; Kazushige Sako, Tokyo; Yoji Shibata, Yokohama; Masahiko Achiha, Iruma, all of Japan

[73] Assignees: Nippon Telegraph, Telephone Public Corp.; Hitachi, Ltd., both of Tokyo, Japan

[21] Appl. No.: 63,467

[22] Filed: Aug. 3, 1979

[30] Foreign Application Priority Data

Aug. 4, 1978 [JP] Japan .................................. 53-94586
Aug. 4, 1978 [JP] Japan .................................. 53-94588

[51] Int. Cl.³ ............................................. H04N 5/76
[52] U.S. Cl. ....................................... 358/4; 360/33; 360/32; 360/9; 360/19; 358/127
[58] Field of Search ......................... 360/32, 9, 33, 19; 358/127, 4, 31, 13, 133, 135, 143

[56] References Cited

U.S. PATENT DOCUMENTS

| 3,921,209 | 11/1975 | Yoshino | 360/32 |
| 4,003,079 | 1/1977 | Woo | 358/4 |
| 4,150,397 | 4/1979 | Russell | 360/9 |
| 4,175,270 | 11/1979 | Zenzefilis | 360/19 |

Primary Examiner—Alan Faber
Attorney, Agent, or Firm—Craig and Antonelli

[57] ABSTRACT

A digital video and audio file system is provided for use in systems such as a center-to-end video communication system. In the file system, video information, such as a color television video signal, is digitized in such a manner that it is separated into a luminance (Y) signal and a carrier chrominance (C) signal and these separated components are processed by the code differential method and the variable length encoding method. The digital signal thus digitized is recorded in a digital recorder. On the other hand, audio information is digitized by the AD-PCM encoding method and recorded in the same recorder. In encoding the video and the audio information, a part of hardware is used in common for both the signals, thus saving the hardware of the file system.

12 Claims, 12 Drawing Figures

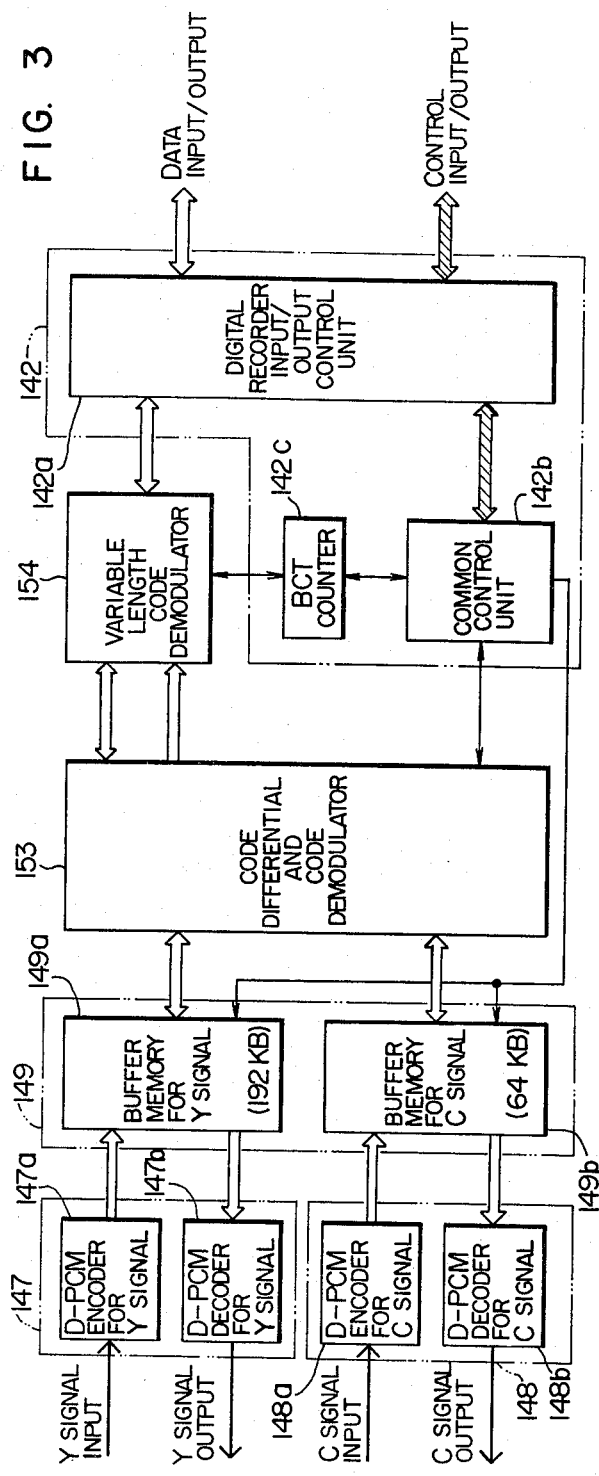
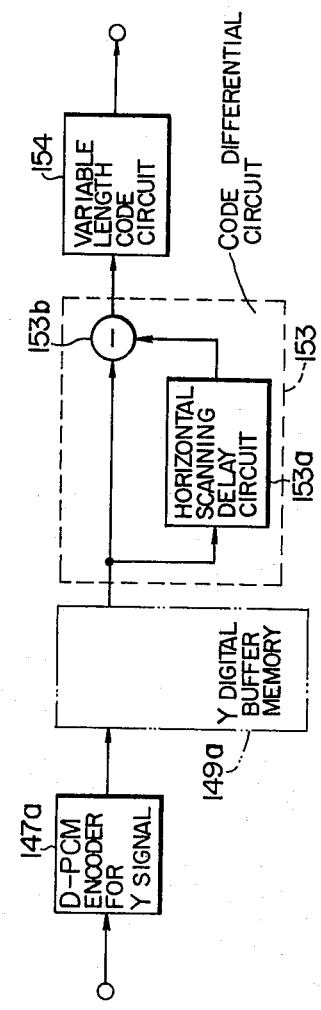

| | PRIOR ART (A) | PRESENT INVENTION (B) | A/B |
|---|---|---|---|
| LANDSCAPE | 360KB/FRAME | 80~100KB/FRAME | 0.25 ($\frac{1}{4}$) |
| COLOR BURST SIGNAL | 360KB/FRAME | 50 KB/FRAME | 0.14 ($\frac{1}{7}$) |

| ACCESS TIME | PRIOR ART (A) | | | | PRESENT INVENTION (B) | | | | B/A |
|---|---|---|---|---|---|---|---|---|---|
| | STAND-BY | SEEK | DATA TRANSFER | TOTAL (A) | STAND-BY | SEEK | DATA TRANSFER | TOTAL (B) | |
| LANDSCAPE | 8 ms | 30 ms | 450 ms | APPROXIMATELY 490 ms | 8 ms | 30 ms | 112 ms | 150 ms | 0.3 |
| COLOR BAR | 8 ms | 30 ms | 450 ms | APPROXIMATELY 490 ms | 8 ms | 30 ms | 62 ms | 100 ms | 0.2 |

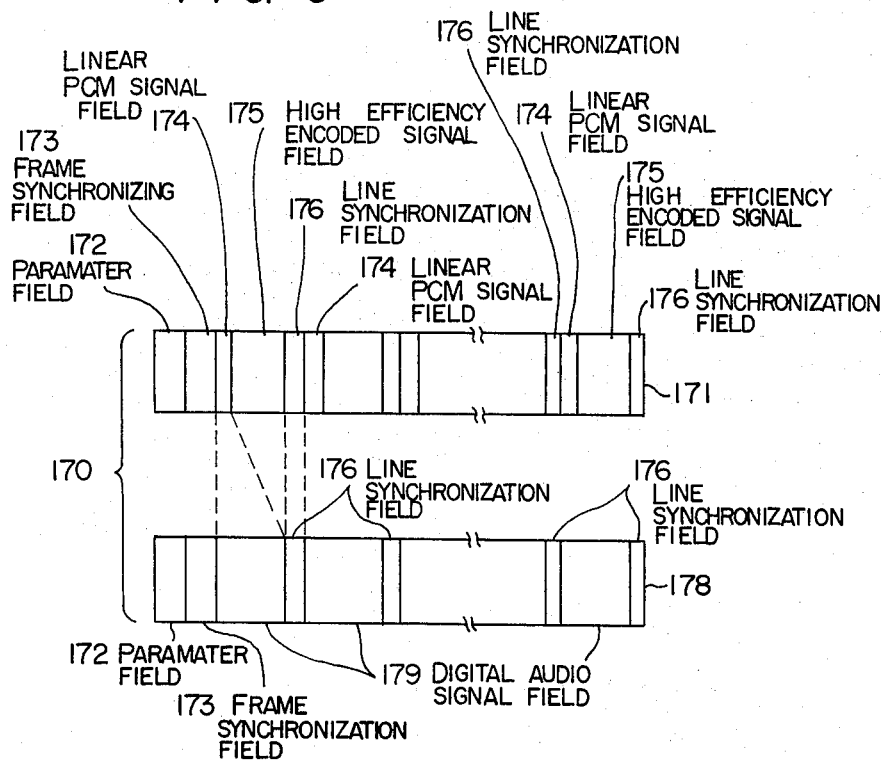

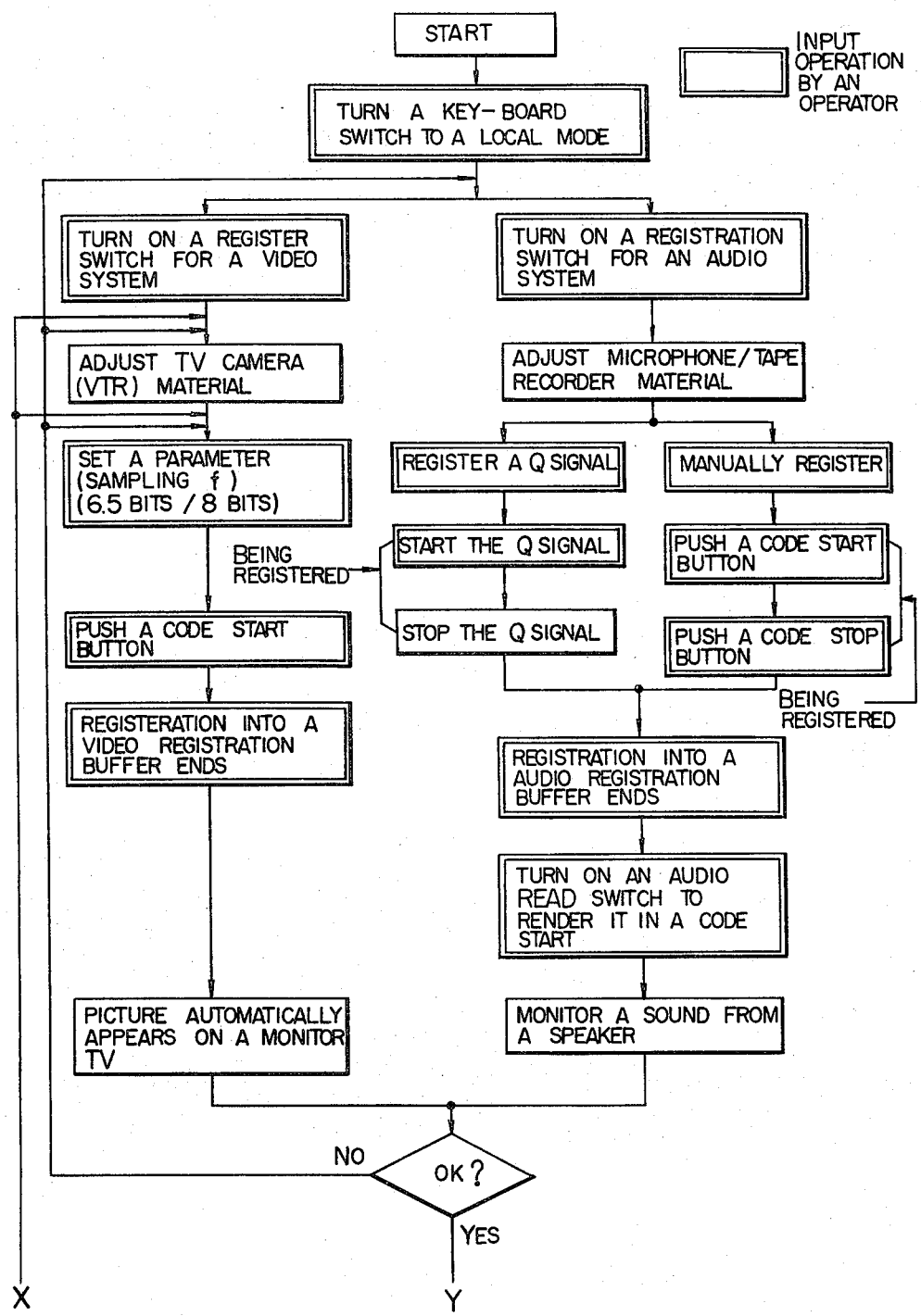
FIG. 9a  MATERIAL REGISTERING SEQUENCE

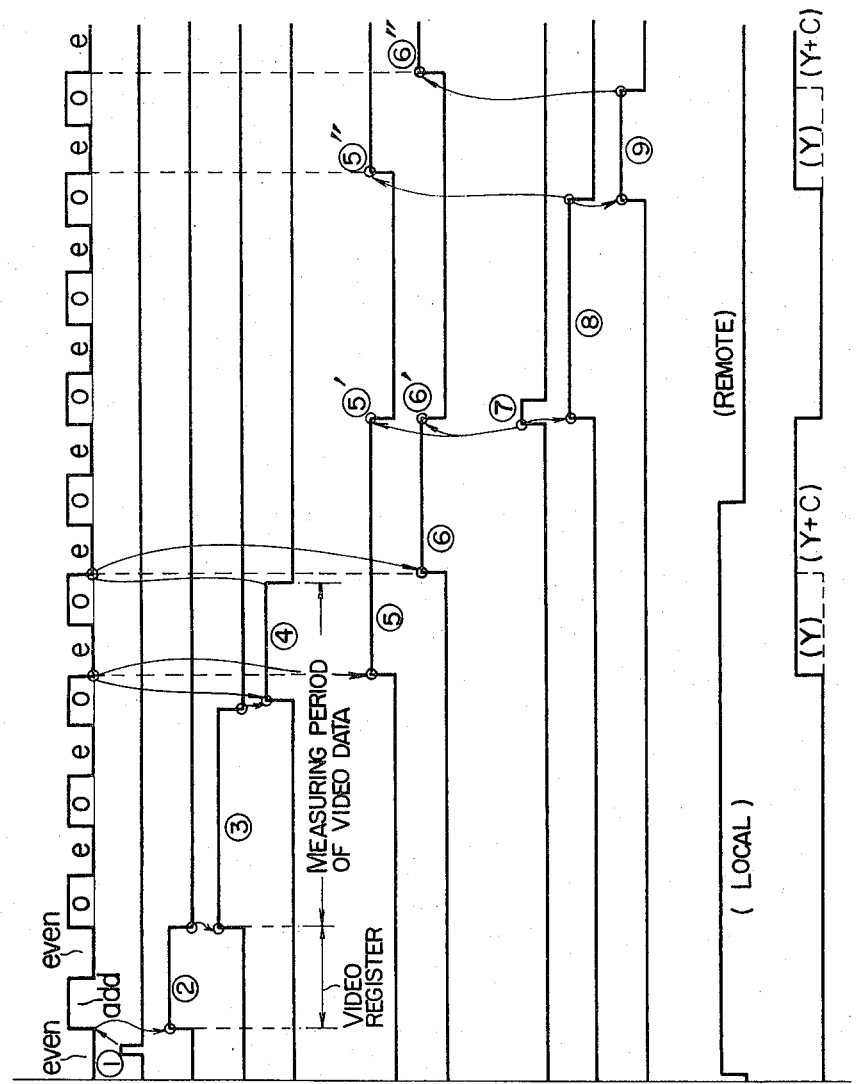

DIGITAL VIDEO AND AUDIO FILE SYSTEM

The present invention relates to a file system for filing the audio and/or video information which is used in a center or a subcenter of a multiplex information service system of the above-mentioned type which is a kind of television-telephone combined system using nationwide communication networks. More specifically, the present invention relates to a digital video and/or audio file system in which the video information, mainly the television picture, and the audio information are digitized and, through the digitization, most of the hardwares are used in common for both types of information, and the digitized ones are stored in a digital memory or recorder.

To cope with a recent tendency of information that the information becomes complicated and highly advanced, many countries have made intensive efforts for developing a multiplex information service system for servicing pictures, data and the like by using wide-band, large channel-capacity communication networks, and some countries have put such systems into practice.

One of the approaches to realize the multiplex information service system is to use multi-purposely the broadcasting and the telephone systems which are basic media. As for the use of the broadcasting system, a character multiplex broadcasting system is already in practice in England, and this has triggered other countries to start practice-purpose experiments of audio and character multiplex broadcasting systems. As for the use of the telephone network, the Post Office in England is now performing an experiment of an information service system (PRESSTEL) for the purpose of practical use, and this system is enjoying favorable evaluation.

Attempts heretofore made to multi-purposely use the broadcasting and the telephone systems may be roughly categorized into: (1) Effective utilization of communication networks already used; (2) Practical application of the systems to local; small-scale information service systems for the public; and (3) Prevalence of information service systems used exclusively for private purposes. In the center-to-end type video and audio communication system thus practiced in use, video files which may be installed at the center and retrieved are digital recording mediums such as microfilms, holograms, video discs, video recorders (VTR), and digital recording mediums such as memory units with very large capacity. Of those analog recording mediums, the microfilms including large capacity microfilms and super-capacity microfilms, holograms and video discs are impossible in rewriting video information thereinto.

On the other hand, the recording media of the digital system allows the rewriting of the video information. In the case of digital magnetic discs, for example, video signals as TV signals are recorded in such a manner that they are passed through an A/D converting circuit and are pulse code modulated. The PCMed signals are then recorded in a digital recording unit. In the recording method, however, since recording or memory capacity of the TV picture ranges from 300 KB to 500 KB, a unit for recording the picture in the form of digital signals is very expensive. Further, the access time from the digital recording unit is long, e.g. 0.4 to 0.7 sec, so that it takes a long time for read-out operation.

In a conventional digital file system of the type in which the audio and the video signals are digitized and filed in a digital recorder, two independent file systems are used for the respective video and audio signals. With such a construction, although most of the hardwares are used in common for the two signal filings, those are separately and independently used, so that the system cost is expensive and uneconomical. Generally, the audio and video signals are processed in pair. Such signal processing is difficult when the conventional file system with two different file systems is used.

Accordingly, an object of the invention is to provide a digital video and audio file system which is low in cost and easy to operate.

Another object of the invention is to provide a digital video and audio file system which is low in cost and allows a high speed read-out operation.

One of the major features of the invention is that a digital signal capacity of one frame of a TV picture is $\frac{1}{4}$ to 1/9 of that of the conventional system and the cost of a still picture file system is reduced $\frac{1}{4}$ to 1/6 compared to the conventional one, and the data access speed is improved two to six times over that of the conventional file system.

Another features of the invention is that a code format is used which is usable in common for the video and audio signals thereby to allow all the hardware between a digital buffer memory and a digital recorder to be used for both the signal systems.

Other objects, features and advantages of the present invention will become apparent from the following detailed description of preferred embodiment thereof taken in conjunction with the accompanying drawings, in which:

FIG. 3 shows in block form the details of a digital signal processing unit and a high efficiency encode circuit which are used in the system shown in FIG. 2;

FIG. 4 shows in block form the detail of a code differential encoder circuit used in the system in FIG. 2;

FIG. 8 shows the formats of a digital video signal code and a digital audio signal code;

FIGS. 9a and 9b show a flow chart for illustrating the recording of material into the digital file system according to the invention;

FIG. 10 shows a set of timing diagrams for illustrating an operation sequence of the file system according to the invention; and FIG. 11 shows a table illustrating economical features of the file system of the invention, while comparing them to the conventional one.

Figure 1:
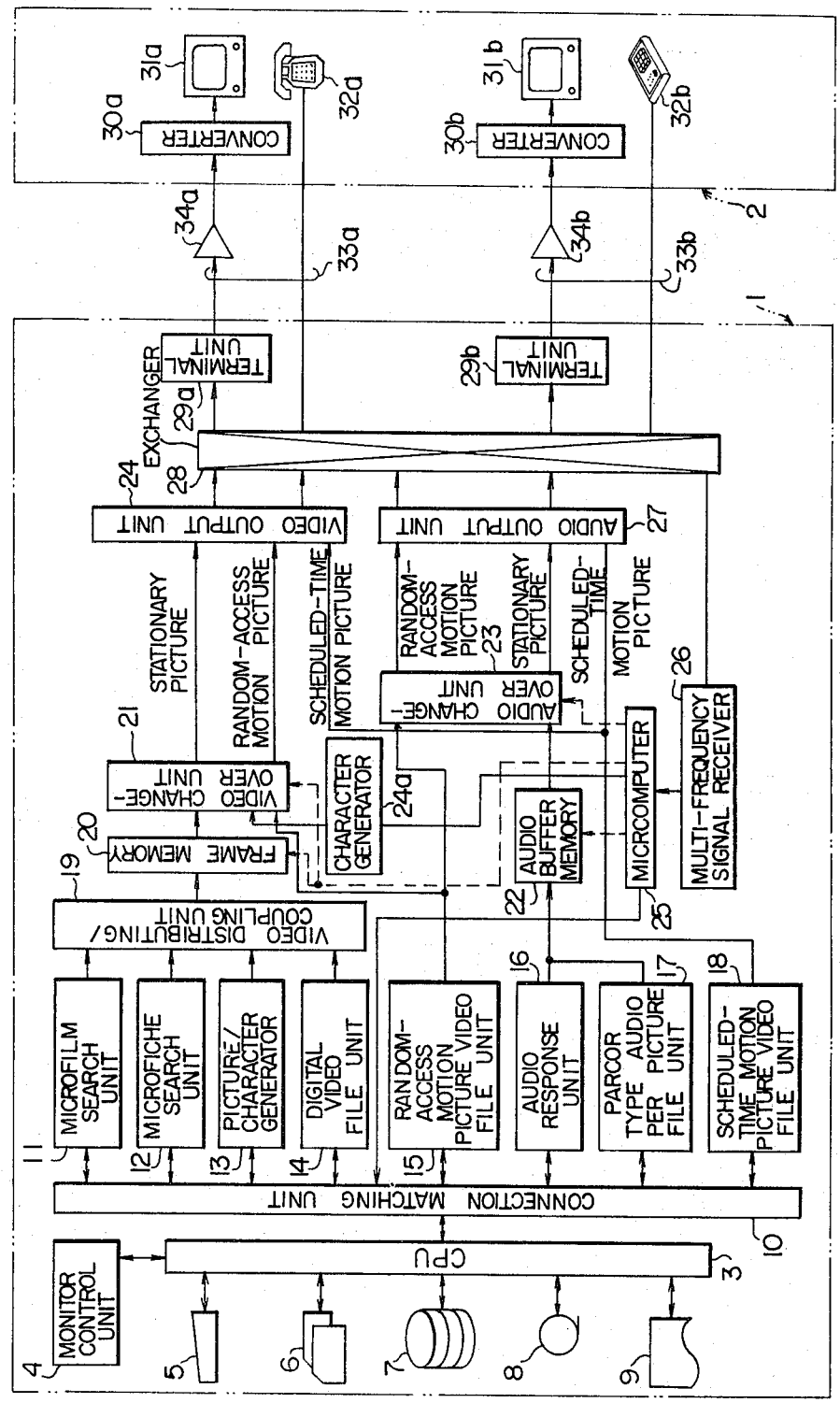
FIG. 1 shows a system block diagram of a video communication system to which a digital video and audio file system according to the invention is applied.

Reference is first made to FIG. 1 illustrating in block form a video and audio response service system of the center-to-end system equipped with a digital video or video and audio file system according to the invention. As shown, the video and audio response service system is generally comprised of a center 1 and a terminal set 2. The center 1 is comprised of a central processing unit (CPU) 3, a monitor control unit 4, a data typewriter 5, a card reader 6, a magnetic disc pack 7, a magnetic tape 8, a line printer 9, a connection matching unit 10, a microfiche search unit 12, a picture/character generator 13, a digital video file unit 14, a random access motion picture video file unit 15, an audio response unit 16, a PARCOR type audio per picture film unit 17, a scheduled-time motion picture video file unit 18, a video distributing/coupling unit 19, a frame memory 20, a video changeover unit 21, an audio buffer memory 22, an audio changeover unit 23, a video output unit 24, a character generator 24a, microcomputer 25, a multi-frequency signal receiver 26, an audio output unit 27, an exchanger 28, and terminal units 29a and 29b.

The terminal set 2 is comprised of converters 30a and 30b, television receivers 31a and 31b, push-phones or simple key-boards 32a and 32b. The terminal set 2 is interconnected with the center 1, through transmission lines 33a and 33b. In the figure, reference numerals 34a and 34b designate wide-band repeat amplifiers 34a and 34b.

In operation, a handset of the push-phone 32a of the terminal set 2 is removed from the hook and then the center 1 is dialed. Upon a response from the center 1, the desired video and audio information is requested by using the push-phone. The center 1 responds to the request from the terminal set so that the related respective units in the center 1 systematically operate. As a result, a video signal (base band) and an audio signal are transmitted to the terminal set 2, through the video and the audio output units 24 and 27, the exchanger 28, and the terminal units 29a and 29b, and further the transmission lines 33a and 33b and the wide band repeat amplifiers 34a and 34b. Those signals received by the terminal sets are converted by converters 30a and 30b into the NTSC system (or PAL system) and then are reproduced by ordinary home-use television sets. In this manner, the desired video signal and the audio signal are obtained.

Figure 2:
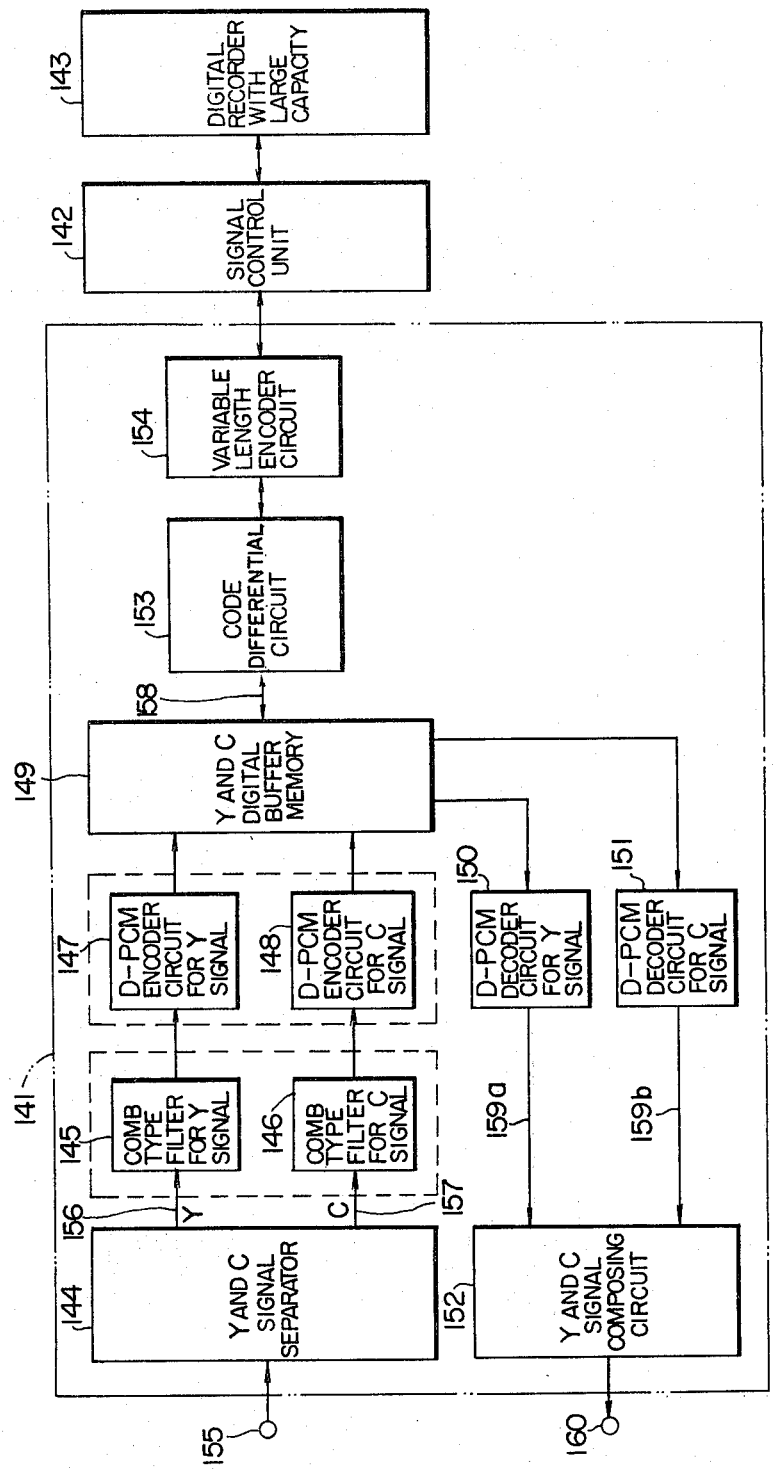
FIG. 2 shows a block diagram of an embodiment of a digital video file system according to the invention.

Turning now to FIGS. 2 and 3, there are shown circuit constructions of a digital video file system 14 according to the invention which may be adapted for the above-mentioned system. The circuit constructions shown are for recording a TV signal. In the figures, reference numeral 141 designates a TV signal processing unit; numeral 142 a signal control unit including a digital recorder input/output controller 142a, a common controller 142b and a BCT counter 142c; 143 a digital recorder or memory unit with a large capacity. The TV signal processing unit 141 is comprised of a Y and C signal separator 144 for separating a luminance (Y) signal and a chrominance (C) signal, a comb type filter 145 for the Y signal, another comb type filter 146 for the C signal, a D-PCM encoder circuit 147 for the Y signal including a D-PCM encoder 147a for the Y signal and a D-PCM decoder 147b, a D-PCM encoder circuit 148 for the C signal including a Y digital buffer memory 149a and a C digital buffer memory 149b, a D-PCM decoder circuit 150 for the Y signal, a D-PCM decoder circuit 151 for the C signal, a composing circuit 152 for composing the Y and the C signals, a code differential circuit 153 provided at the output portion of the digital buffer memory 149, and a variable length encoder circuit 154.

In operation, an NTSC signal as a TV signal is applied to an input terminal 155. Upon receipt of the TV signal, the separator 144 separates the TV signal into a Y signal 156 and a C signal 157. The separated signals are passed through comb type filters 145 and 146 in order to remove cross color and dot disturbances and to improve the coding efficiency. Then, those filtered-out signals are applied to the Y signal D-PCM encoder circuit 147 of 3 to 7 bits and the C signal D-PCM encoder circuit 148 of the same number of bits for the predictive encoding. As shown in FIG. 3, the circuit blocks 144 to 148 cooperate to form a high efficiency encoder circuit for digitizing the TV analog signal. Although the Y and C separation type D-PCM system is employed in the embodiment, any other suitable system may also be used. After that, the digitized TV signal is temporarily stored in the digital buffer memory 149. The buffer memory 149 is used to change the speed of an input signal and to convert an interlaced received signal into a non-interlaced signal. Then, the digital TV output signal 158 enters the code differential encoder circuit 153 where it is subtracted from a signal D-PCM signal preceding by one horizontal scanning period to a marked sampling point of the D-PCM coded signal. The output signal from the code differential encoder circuit 153 is inputted to the variable length encoder circuit 154. Of the output digital signals from the variable length encoder circuit 154, short codes are assigned to the signals which appear frequently while long codes are assigned to the signals which seldom appear, and a variable length code signal is formed by the variable length encoder. The variable length code signal is then under control of the signal control unit 142 and is stored into the digital recorder 143.

In reading out the TV signal, an inverse control operation is performed. Specifically, as indicated by an arrow, the recorded information from the digital recorder 143 is applied through the signal control unit 141 to the variable length encoder circuit 154 and then is applied to the code differential encoder circuit 153 where it is restored to its original state. The restored signal is applied to the Y signal D-PCM decoder circuit 150 and the C signal D-PCM decoder circuit 151, through the digital buffer memory 149. The decoded signals 159a and 159b decoded by the decoder circuits 150 and 151 are composed by the composing circuit 152. Finally, the desired original NTSC signal is obtained from the output terminal 160.

The detail of the code differential encode circuit 153 used in the digital video and audio file system according to the invention is shown in FIG. 4. In the figure, reference numeral 153a designates a horizontal scanning delay circuit and numeral 153b a subtractor circuit. A digital TV signal 158 read out from the digital buffer memory 149 is subtracted from a signal delayed by one horizontal scanning time, i.e. a D-PCM signal before one horizontal scanning time, in the horizontal scanning period delay circuit 153a. The subtracted one is inputted to the variable encoder circuit 15A where it is processed by the variable length encoding method.

Figures 5, 6, 7:
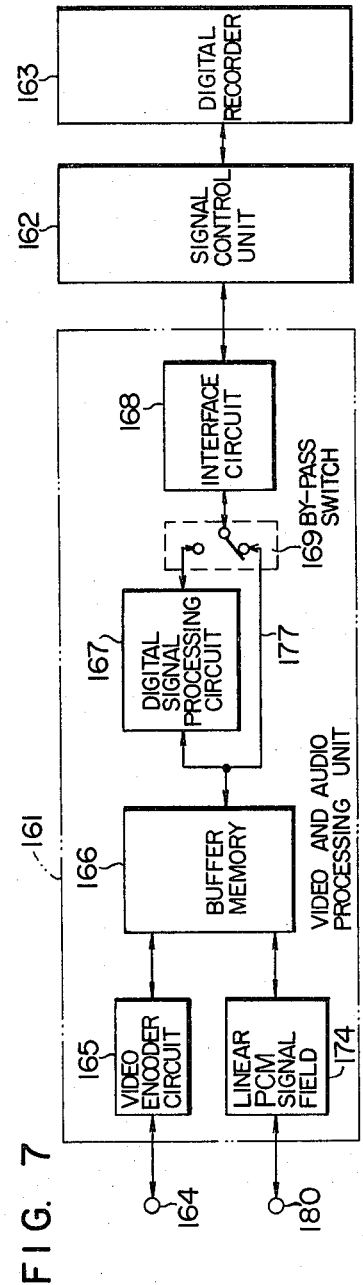
FIG. 5 is a table comparatively tabulating the recording or memory capacities per frame between the file system of the invention and the conventional one.
FIG. 6 shows a table comparatively tabulating access times of a digital recorder when the file system according to the invention and the conventional one are used.
FIG. 7 shows a block diagram of another embodiment of a digital file system according to the invention.

An experiment conducted by the inventors showed the following results. In the experiment, by using a predictive encoder circuit, the TV signal is separated into the Y and C signals. These separated signals are subjected to D-PCM encoding of 5 bits with sampling at three times subcarrier frequency. The picture quality is kept at 4.5 or more with respect to the five-grade evaluation. With respect to the high efficiency coding of the main, when recording is made of only the video signal portion except the code differential, the variable length recording and the synchronizing signal sections, the recording capacity of one picture is ¼ to 1/9 of that of the conventional one, as shown in FIG. 5. The memory capacity of one picture thus results in ¼ to 1/9 of the conventional one. Therefore, the data transfer time from the digital memory unit is substantially reduced. When the digital recording system such as the computer disc IBM3330-11 is used, the searching time is reduced to be ⅓ to 1/5, as shown in FIG. 6.

FIG. 7 shows another embodiment of the digital video and audio file system according to the invention. A feature of the file system resides in that a code format employed for the audio digital signal is the same as that of the video digital signal, and the hardware between the digital buffer memory and the digital memory unit is used in common for both the video and the audio digital signals. The video signal and the audio signal are applied to a video and audio processor 161 where these are digitized and encoded in the form of proper coding formats. The coded signal is recorded into a digital recorder 163 under control of a signal control unit 162. In reading out data, the operation is performed at the respective portions in an inverse manner.

The operation of the video and audio processing unit 161 will be explained below. For recording a picture, a video input signal 164 such as a TV signal is subjected to PCM. In this case, only the first sampled value immediately after the horizontal blanking period is terminated, and several sampled values of the color burst signal are PCMed. Alternately, the remaining part of the video input signal is D-PCMed. In that case, the PCM or the D-PCM operation is performed by a video encoder circuit 165 with the same constructions as those of 144 to 148 shown in FIG. 2. Then, one frame of the TV signal is temporarily stored in a buffer memory 166. After that, data is read out at a proper speed from the buffer memory 166 and the read-out data is processed by the code differential method and the variable length encoding method in a digital signal processing circuit 167 with the same constructions as those of 153 and 154 shown in FIG. 3. The thus processed signal is outputted through an interface circuit 168 and then is recorded in the digital recorder through the signal control system 162. For the PCM signal, the coding processing is not necessary, and the PCM signal is directly applied from the buffer memory 166 to the interface circuit 168, through the by-pass switch 169. Succeedingly, the signal inputting operation is made in a similar manner. The format of the video signal code as shown in FIG. 8, is comprised of a parameter field 172, a frame synchronizing field 173, a linear PCM signal field 174, a high efficiency encoded signal field 175 and a line synchronizing field 176. In the format, the parameter field 172 includes codes representing a discrimination of the video and the audio, the number of data in one frame, and sampling. The line synchronization field 176 includes codes representing a discrimination of the luminance signal and the color signal or an interval of the synchronizing signal. Incidentally, during the interval, the buffer memory is refreshed.

In reading out data, the operation is made in a manner inverse to that when the video input signal is recorded, as mentioned above.

Next, the input and output operations of the audio input signal 180 will be described. There is a difference of approximately $10^3$ times between the sampling frequencies of the audio input signal and the video input signal. Accordingly, the buffer memory 166 is used as a speech changing memory and a code conversion memory for converting the signal format of the audio signal into the same signal format as the video signal. The maximum length of a sentence of audio signal recorded is determined in accordance with the capacity of the buffer memory 166 and is approximately 20 sec. The audio signal is applied to the audio encoding circuit 174 where it is subjected to AD-PCM, or ΔM or linear PCM to be digitized is loaded into the buffer memory 166. The digitized audio signal is transferred to the buffer memory where its transfer speed is changed to that of video signal. The speed-changed digital audio signal is transferred from the buffer memory to the interface circuit 168, through the by-pass circuit 177. Leaving the interface circuit 168, the audio signal is written into the large-capacity digital recorder 163. The code format of the digital audio signal includes a parameter field 172, a frame synchronization field 173, a digital audio signal field 179, and a line synchronization field 176, as shown in FIG. 8.

As described above, the digital audio signal is treated in exactly the same way as the linear PCM signal of the digital picture signal is treated. Accordingly, little additional hardware for the audio file is needed, except the audio encoder circuit 174. As a result, the video file system may be adapted for the audio file system, with being little changed.

Figure 9B:
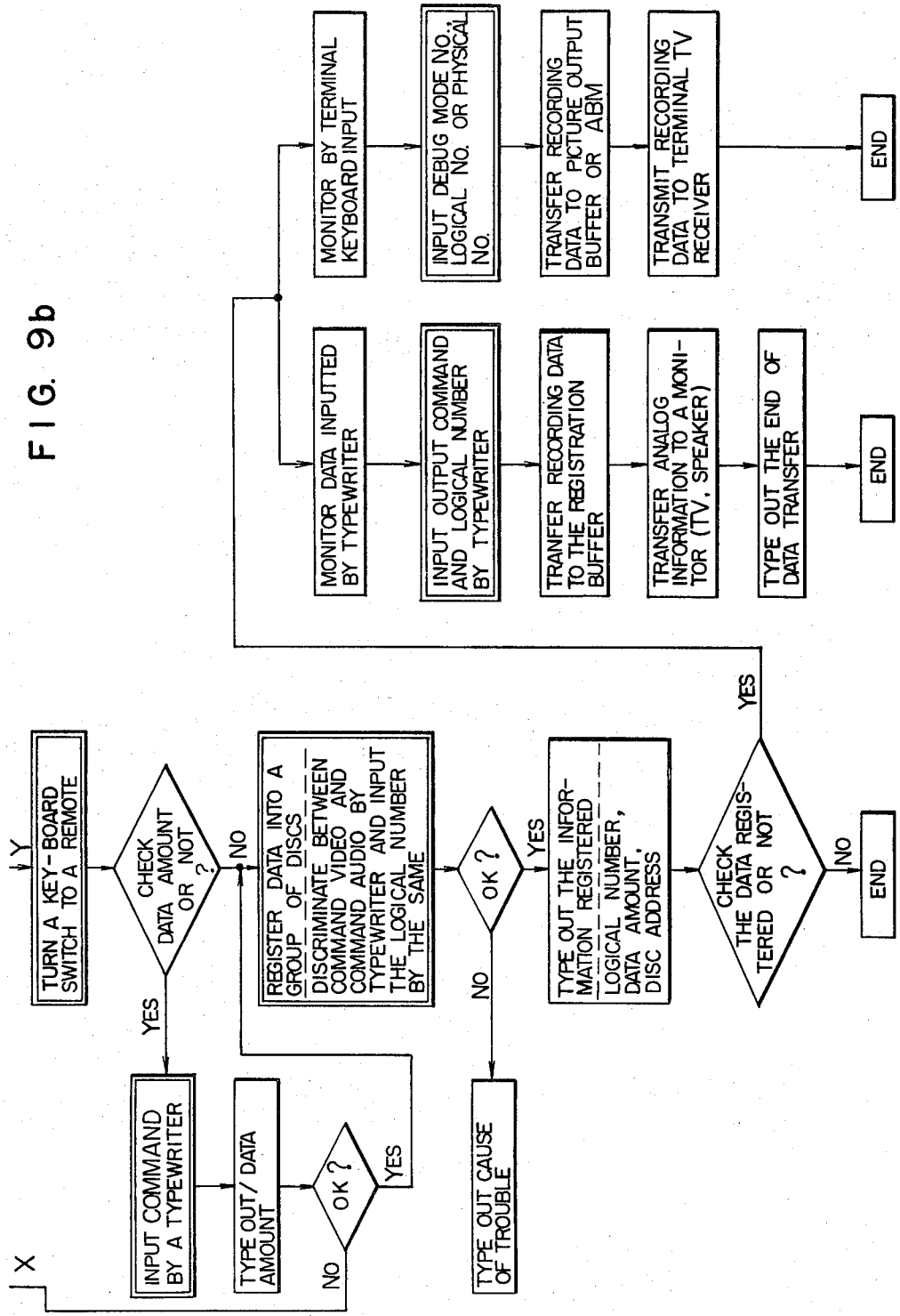

Turning now to FIGS. 9a and 9b, there is shown a flow chart for illustrating a procedure for recording material, or the audio and the video information, into the digital video and audio file system mentioned above. In the flow chart, blocks with thick lines indicate input operations by an operator. FIG. 10 shows an operation sequence of the file system at that time.

From the foregoing description, it is seen that the circuit portion handling the digital signal is quite common for the video and the audio signals. For this, the file system of the invention is very economical, as seen from the table shown in FIG. 11. Further, the saved or economized portions as a result of the use of the common circuitry for the video and the audio signal processings, are as shown in FIG. 11. In the tabulation of FIG. 11, the large capacity digital file or recorder is not considered because it changes on the basis of the system construction, for example, the number of pictures to be filed.

What is claimed is:

1. A digital video file system comprising:
   a high efficiency encoder circuit for converting an analog TV signal into a digital TV signal;
   a buffer memory circuit for temporarily storing the digital TV signal;
   a digital signal processing circuit coupled to the output of the buffer memory for reducing in the digital form a redundancy of the digital TV signal in the amplitude direction in a code differential manner;
   a digital variable length encoding circuit coupled to the output of the digital signal processing circuit for generating a digital variable length output coded TV signal from the output signal of the digital signal processing circuit; and
   a large-capacity digital recorder coupled to the digital variable length encoding circuit for recording the digital variable length output coded TV signals.

2. A digital video file system according to claim 1, in which said high efficiency encoding circuit includes a separating circuit for separating the analog TV signal into a luminance (Y) signal and a chrominance (C) signal, a first comb type filter for the Y signal, a second comb type filter for the C signal, a Y signal encoding circuit, and a C signal encoding circuit.

3. A digital video file system according to claim 1 or 2, in which said encoding circuits for the Y and C signals each include a D-PCM encoder.

4. A digital video file system according to claim 1, in which said digital signal processing circuit includes a code differential encoding circuit.

5. A digital video and audio file system comprising:
a high efficiency encoding circuit for converting an analog TV signal into a digital TV signal;
an encoding circuit for converting an audio signal with a fixed time length into a digital audio signal;
a buffer memory circuit for temporarily storing the two kinds of digital signals derived from both said encoding circuits;
a digital signal processing circuit coupled to the output of the buffer memory for reducing in the digital form a redundancy of the digital TV signal in the amplitude direction in a code differential manner;
a large capacity digital recorder coupled to said digital processing circuit output for recording the digital TV and digital audio signals;
a by-pass circuit coupled between said buffer memory and said recorder to allow bypassing of said digital signal processing circuit for the digital audio signals stored in said buffer memory which do not need processing in said digital signal processing circuit; and
a signal control unit for controlling signals transferring between said digital recorder and said digital processing circuit and said buffer memory.

6. A digital video and audio file system according to claim 5, in which said high efficiency encoding circuit includes a separator for separating the analog TV signal into a luminance (Y) signal and a chrominance (C) signal, a comb type filter for the Y signal, a comb type filter for the C signal, D-PCM encoder for the Y signal and a D-PCM decoder for the C signal.

7. A digital video and audio file system according to claim 5, in which said video signal processing circuit includes a digital variable length encoding circuit and a code differential encoding circuit.

8. A digital video and audio file system according to claim 5, in which said audio signal processing circuit is a circuit for digitizing an audio signal by using an AD-PCM, or ΔM or linear PCM method.

9. A digital video file system according to claim 1 or 2, further comprising:
a variable length code demodulator and a code differential demodulator coupled between the digital recorder and the buffer memory for demodulating recorded digital variable length coded TV signals and storing the demodulated digital TV signals in said buffer memory;
a decoder circuit coupled to the buffer memory for decoding the demodulated digital TV signals into analog TV signals; and
a composing circuit coupled to the output of the decoder circuit for composing the decoded analog TV signals.

10. A digital video file system according to claim 9, wherein the decoder circuit is a D-PCM decoder.

11. A digital and audio file system according to claim 5, wherein the buffer memory circuit includes means for converting the signal format of the digital audio signal into the same signal format as the digital TV signal.

12. A digital video file system according to claim 1 or 7, wherein the digital variable length encoding circuit encodes the output signal of the digital signal processing circuit by assigning short codes to signals which appear frequently and long codes to signals which appear infrequently.

* * * * *